(12) United States Patent
Nagao et al.

(10) Patent No.: US 8,653,177 B2
(45) Date of Patent: Feb. 18, 2014

(54) SEMICONDUCTIVE RESIN COMPOSITION

(75) Inventors: Yuji Nagao, Tokyo (JP); Ryuji Yamamoto, Tokyo (JP)

(73) Assignee: Showa Denko K.K., Tokyo (JP)

( * ) Notice: Subject to any disclaimer, the term of this patent is extended or adjusted under 35 U.S.C. 154(b) by 704 days.

(21) Appl. No.: 11/925,290

(22) Filed: Oct. 26, 2007

(65) Prior Publication Data

US 2010/0173108 A1    Jul. 8, 2010

(30) Foreign Application Priority Data

Feb. 28, 2007   (JP) .................................. 2007-049730

(51) Int. Cl.
*B60C 1/00* (2006.01)
*C08K 3/04* (2006.01)

(52) U.S. Cl.
USPC .......................................... 524/495; 524/496

(58) Field of Classification Search
USPC .................................. 524/495, 496
See application file for complete search history.

(56) References Cited

U.S. PATENT DOCUMENTS

| | | | |
|---|---|---|---|
| 5,688,862 A | 11/1997 | Kondou et al. | |
| 6,380,294 B1 | 4/2002 | Babinec et al. | |
| 6,780,388 B2 | 8/2004 | Masuko et al. | |
| 7,132,062 B1 | 11/2006 | Howard | |
| 7,329,698 B2 | 2/2008 | Noguchi et al. | |
| 7,338,730 B2 | 3/2008 | Noguchi et al. | |
| 7,585,434 B2 | 9/2009 | Morita et al. | |
| 2002/0051903 A1 | 5/2002 | Masuko et al. | |
| 2005/0171270 A1 | 8/2005 | Noguchi et al. | |
| 2006/0035081 A1 | 2/2006 | Morita et al. | |
| 2007/0021546 A1 * | 1/2007 | Nagao et al. .................. | 524/496 |
| 2007/0181855 A1 * | 8/2007 | Nagao et al. .................. | 252/500 |
| 2007/0200098 A1 * | 8/2007 | Nagao et al. .................. | 252/500 |

FOREIGN PATENT DOCUMENTS

| | | | |
|---|---|---|---|
| JP | 09-087418 A | 3/1997 | |
| JP | 2001-118222 A | 4/2001 | |
| JP | 2001-247772 A | 9/2001 | |
| JP | 2002-080720 A | 3/2002 | |
| JP | 2002-121402 A | 4/2002 | |
| JP | 2003-261688 A | 9/2003 | |
| JP | 2003-313428 A | 11/2003 | |
| JP | 2004-221071 A | 8/2004 | |
| JP | 2006-225648 A | 8/2006 | |
| WO | WO 2005023937 A1 * | 3/2005 | ............ C08L 101/00 |

* cited by examiner

*Primary Examiner* — Angela C Scott
(74) *Attorney, Agent, or Firm* — Sughrue Mion, PLLC

(57) ABSTRACT

The invention relates to a semiconductive resin composition containing at least two kinds of conductive fillers, wherein the difference in threshold values of percolation between at least two kinds of the conductive fillers is within a range of 10 to 50 mass %. The semiconductive resin composition of the present invention can be used widely in various form of molded products, such as component used for transport in a clean room, spin chuck, IC test socket, various rollers installed in copier, seamless belt, bearing, antistatic fiber, member for electrostatic coating, fuel tube, part around fuel or chemical tube.

25 Claims, No Drawings

SEMICONDUCTIVE RESIN COMPOSITION

TECHNICAL FIELD

The present invention relates to a semiconductive resin composition. More specifically, the invention relates to a semiconductive resin composition excellent in reproducibility of volume resistivity, in which volume resistivity can be controlled to a desired value in its semiconductive region, production method thereof, a product formed by using the composition and uses of various articles using the molded product.

BACKGROUND ART

Materials having volume resistivity of $10^6$ to $10^{12}$ $\Omega$cm which is at the level intermediate between the volume resistivity of metals and that of insulating materials, are generally called "semiconductive resins". Semiconductive resins, with their advantages in antistatic property, dust-adsorption preventing property and the like, are used fields where static control is required, for example, such a material is used as resin material for charging components like charging rolls, charging belts and discharging belts of image formation devices such as electrophotographic copiers and electrostatic recording devices and like containers for transporting semiconductor components. However, recently, for the purpose of enhancing transcription efficiency of the copier and obtaining clearer images or slowly eliminating static electricity from precision components, it is required to control the volume resistivity to a very narrow range such as $10^{10}$ to $10^{12}$ $\Omega$cm in semiconductive region.

Generally, examples of method for imparting conductivity to an electrically insulative resin include (1) a method of adding surfactant, (2) a method of converting the resin into alloy with a hydrophilic polymer having a conductive unit in its molecule and (3) a method of mixing the resin with conductive material such as metal or carbon material.

DISCLOSURE OF INVENTION

The method (1) using surfactant is a method of expressing conductivity by allowing a low molecular weight surfactant to bleed out on the resin surface and absorb moisture present in the atmosphere. In this method, the volume resistivity obtained here is on the order of $10^9$ to $10^{12}$ $\Omega$cm and when the surface is washed, the surfactant having bled out there is washed away to thereby reduce conductivity.

With respect to the method (2) involving conversion into alloy with hydrophilic polymer, since ion mobility dominates conductivity, the obtained volume resistivity is limited to, at most, a range of $10^9$ to $10^{12}$ $\Omega$cm. Further, in a polymer alloy, since the size or shape of a dispersion phase is easily changed according to forming conditions, it is difficult to stably form a ion conducting path and as a result, the resistivity cannot be controlled precisely.

With respect to the method (3) of mixing with conductive material, as a conductive material is added to the resin, a conductive network is formed three-dimensionally at a certain addition amount point and a percolation phenomenon where the resistivity plunges from $10^{16}$ to $10^0$ $\Omega$cm is observed. Accordingly, it is generally considered as difficult to control the resistivity to a range of $10^6$ to $10^{12}$ $\Omega$cm. Under these circumstances, a production process of a semiconductive resin composition by mixing a matrix thermoplastic resin, fine carbon fiber having an average diameter of 200 nm or less, a non-matrix thermoplastic resin and/or a thermoplastic elastomer together has been proposed (in Japanese Patent Application Laid-Open No. 2003-261688). By using non-compatible resins, this method can form an island structure of dispersion phase resin in the matrix resin (sea) to disrupt contact between fine carbon fibers with the dispersion phase resin, to thereby obtain semiconductivity. In this method, as in the foregoing method of conversion into alloy with hydrophilic polymer, since it is difficult to control the size or shape of the dispersion phase according to forming conditions, semiconductivity cannot be stably obtained.

In addition, another semiconductive resin composition obtained by combination of the methods (2) and (3), comprising a matrix resin having carbon fiber and polymer-type antistatic agent blended therein, has been proposed in Japanese Patent Application Laid-Open No. 2003-313428. Also in this method, since it is difficult to stably control the sea-island structure according to forming conditions, semiconductivity is hard to be obtained.

Furthermore, still another semiconductive resin composition obtained by mixing conductive thermoplastic resin (A) having surface resistivity of $10^6\Omega$ less and containing carbon black and/or carbon fiber with conductive thermoplastic resin (B) having surface resistivity of $10^{12}\Omega$ or more and containing carbon black and/or carbon fiber compatible with (A) has been proposed in Japanese Patent Application Laid-Open No. 2001-247772). This method simply mixes 2 kinds of conductive resins. At the time of mixing, the dispersion and distribution states of the two resins greatly fluctuate according to kneading intensity, which leads to surface resistance of a broad range of $10^6$ to $10^{12}\Omega$ especially in a case where kneading irregularities are generated.

On the other hand, semiconductive resin compositions comprising synthetic resin having particles of carbon precursor and carbon fiber blended therein has been proposed in Japanese Patent Application Laid-Open NOs. 2002-121402, 2002-80720 and H09-87418. In these documents, the term "particles of carbon precursor" is a carbonaceous material having a carbon content of 97 mass % or less. That is, in these documents, addition of a carbonaceous material having a high content of impurities and a volume resistivity of $10^2$ $\Omega$cm or higher is intended to suppress rapid changes in volume resistivity at the time of formation. (See Japanese Patent Application Laid-Open NO. H09-87418.) However, in this method, a desired resistivity cannot obtained unless the composition contains 30 mass % or more of particles of carbon precursor and carbon fiber in total. Moreover, the rigid carbon fiber, which is used as conductivity adjuster, is broken by shearing force at the time of kneading or formation, which causes great fluctuation in resistivity.

The present invention provides a stable semiconductive resin composition realizing small change in volume resistivity even if fluctuations of around 10 mass % in the conductive filler content occur, by suppressing phenomenon of rapid decrease in resistance caused by addition of conductive filler to an electrically insulative resin.

As a result of extensive studies the present inventors have made from a view to solving the problems, they have found out that by allowing an electrically insulative resin to contain two kinds of conductive fillers having different threshold values of percolation in a specific range, a semiconductive resin composition having a stable volume resistivity can be obtained. The term "threshold value of percolation" used herein indicates the mass content of a conductive filler when the volume resistivity of resin drastically changes from an insulative region to a conductive region in adding the conductive filler to the resin.

That is, according to the present invention, the following semiconductive resin composition, production method thereof, a product using the composition and uses of various articles using the molded product, can be provided.

1. A semiconductive resin composition containing two or more kinds of conductive fillers, wherein the difference in threshold values of percolation between at least two kinds of the conductive fillers is within a range of 10 to 50 mass %.

2. The semiconductive resin composition according to 1, wherein the at least two kinds of the conductive fillers each contain 98 mass % or more of carbon and the volume resistivity of each of the fillers is $10^1 \Omega$ cm or less.

3. The semiconductive resin composition according to 1 or 2, wherein the difference between at least two kinds of the conductive fillers in threshold values of percolation obtained in adding a single conductive filler to a resin is within a range of 20 to 40 mass %.

4. The semiconductive resin composition according to any one of 1 to 3, comprising conductive filler (A) having a threshold value of percolation of 2 to 10 mass % and conductive filler (B) having a threshold value of percolation of 13 to 60 mass, the threshold value of percolation being obtained in adding a single conductive filler to a resin.

5. The semiconductive resin composition according to 4, comprising from 1 to 10 mass % of conductive filler (A) and from 5 to 19 mass % of conductive filler (B) in thermoplastic resin.

6. The semiconductive resin composition according to 5, wherein the total content of conductive filler (A) and conductive filler (B) in the thermoplastic resin is 20 mass % or less.

7. The semiconductive resin composition according to any one of 4 to 6, wherein conductive filler (A) is fine graphitic fiber having a fiber diameter of 3.5 to 120 nm.

8. The semiconductive resin composition according to any one of 4 to 7, wherein conductive filler (B) is fine graphitic fiber having a fiber diameter of 120 to 500 nm, carbon fiber having a fiber diameter of 3 to 12 μm or carbon particles having a particle size of 1 to 500 μm.

9. The semiconductive resin composition according to any one of 5 to 8, wherein the thermoplastic resin is at least one kind selected from the group consisting of polypropylene, polystyrene, ABS resin, polyacetal, polybutylene terephthalate, polycarbonate, polyamide, polyphenylene ether, polyphenylene sulfide, polyether ether ketone, polyether ketone, polysulfone, polyether sulfone, polyether imide, liquid crystal polymer, cycloolefin polymer, fluorine resin, polyimide and polybenzimidazole.

10. The semiconductive resin composition according to any one of 1 to 9, comprising a region where change in volume resistivity of the resin complex is $10^{X\pm1}$ $\Omega$cm ($2 \leq X \leq 11$) in an extent that the total amount of the conductive fillers in the resin is within a range of 10 to 20 mass %.

11. A method of producing the semiconductive resin composition containing two or more kinds of fillers, wherein at least two kinds of the conductive fillers having a difference in threshold values of percolation between the two within a range of 10 to 50 mass % are blended in a thermoplastic resin.

12. The method of producing the semiconductive resin composition according to 11, wherein the at least two kinds of the conductive fillers each contain 98 mass % or more of carbon and the volume resistivity of each of the fillers is $10^1$ $\Omega$cm or less.

13. The method of producing the semiconductive resin composition according to 11 or 12, wherein the difference between at least two kinds of the conductive fillers in threshold values of percolation is within a range of 20 to 40 mass %, the threshold value of percolation being obtained in adding a single conductive filler to a resin.

14. The method of producing the semiconductive resin composition according to any one of 11 to 13, comprising conductive filler (A) having a threshold value of percolation of 2 to 10 mass % and conductive filler (B) having a threshold value of percolation of 13 to 60 mass %, the threshold value of percolation being obtained in adding a single conductive filler to a resin.

15. The method of producing the semiconductive resin composition according to 14, comprising from 1 to 10 mass % of conductive filler (A) and from 5 to 19 mass % of conductive filler (B) in thermoplastic resin.

16. The method of producing the semiconductive resin composition according to 15, wherein the total content of conductive filler (A) and conductive filler (B) in thermoplastic resin is 20 mass % or less.

17. The method of producing the semiconductive resin composition according to any one of 14 to 16, wherein conductive filler (A) is fine graphitic fiber having a fiber diameter of 3.5 to 120 nm.

18. The method of producing the semiconductive resin composition according to any one of 14 to 17, wherein conductive filler (B) is fine graphitic fiber having a fiber diameter of 120 to 500 nm, carbon fiber having a fiber diameter of 3 to 12 μm or carbon particles having a particle size of 1 to 500 μm.

19. The method of producing the semiconductive resin composition according to any one of 15 to 18, wherein the thermoplastic resin is at least one kind selected from the group consisting of polypropylene, polystyrene, ABS resin, polyacetal, polybutylene terephthalate, polycarbonate, polyamide, polyphenylene ether, polyphenylene sulfide, polyether ether ketone, polyether ketone, polysulfone, polyether sulfone, polyether imide, liquid crystal polymer, cycloolefin polymer, fluorine resin, polyimide and polybenzimidazole.

20. The method of producing the semiconductive resin composition according to any one of 14 to 17, wherein conductive fillers (A) is a fine graphitic fiber in melt-blending conductive fillers (A) and (B) in the thermoplastic resin and rupture of the fine graphitic fiber is controlled to be 20% or less.

21. The method of producing the semiconductive resin composition according to any one of 11 to 20, comprising a region where change in volume resistivity of the resin complex is $10^{X\pm1}$ $\Omega$cm ($2 \leq X \leq 11$) when the total amount of the conductive fillers in the resin is within a range of 10 to 20 mass %.

22. A product formed of the semiconductive resin composition described in any one of 1 to 10.

23. An injection-molded product formed of the semiconductive resin composition described in any one of 1 to 10.

24. The injection-molded product according to 23, wherein change in volume resistivity at each point is $10^{X\pm1}$ $\Omega$cm ($2 \leq X \leq 11$).

25. A compression-molded product formed of the semiconductive resin composition described in any one of 1 to 10.

26. The compression-molded product according to 25, wherein change in volume resistivity at each point is $10^{X\pm1}$ $\Omega$cm ($2 \leq X \leq 11$).

27. An extrusion-molded product formed of the semiconductive resin composition described in any one of 1 to 10.

28. The extrusion-molded product according to 27, wherein change in volume resistivity at each point is $10^{X\pm1}$ $\Omega$cm ($2 \leq X \leq 11$).

29. A sheet product formed of the semiconductive resin composition described in any one of 1 to 10.

30. The sheet formed body described in 29, wherein change in volume resistivity at each point is $10^{X\pm1}$ $\Omega$cm ($2 \leq X \leq 11$).

31. The formed product according to any one of 22 to 28, formed of the semiconductive resin composition described in any one of 1 to 10, wherein the number of particles having a particle size of 1 μm or more dropping off the surface of the formed body is 5000 pcs/cm² per unit area or less when the formed body having a surface area of 100 to 1000 cm² is immersed in 500 ml of pure water and ultrasonic wave of 40 kHz is applied for 60 seconds.

32. The formed product according to any one of 22 to 28, formed of the semiconductive resin composition described in any one of 1 to 10, wherein the total outgas amount is 1 μg/g or less, the amount of methylene chloride is 0.1 μg/g or less, and the amount of hydrocarbon is 0.5 μg/g or less in measurement on those generated from 12.6 cm² of surface area by headspace gas chromatogram under conditions of heating temperature of 85° C. and equilibration time of 16 hours.

33. A part used in transportation comprising the formed product according to any one of 22 to 28.

34. A part used in transportation in clean room, comprising the formed product according to any one of 22 to 28.

35. An article formed of the semiconductive resin composition described in any one of 1 to 10.

36. The article according to 35, wherein the article is a spin chuck, an IC test socket, various rolls in copiers, a seamless belt, a roller bearing, an antistatic fiber, a part for electrostatic coating, a fuel tube, a peripheral part around fuel or a tube for chemicals.

The present invention can provide a semiconductive resin in which change in volume resistivity is controlled to be within a range of $10^{X\pm1}$ Ωcm even if fluctuation of 10 mass % or so occurs in the conductive filler content, by adding to the resin at least two kinds of conductive fillers having threshold values of percolation different from each other by a range of 20 to 60 mass %, each of the threshold values being measured at the time of adding each of the fillers singly to the resin. In the present invention, that "change in volume resistivity is controlled to be within a range of $10^{X\pm1}$ Ωcm" means that the difference in numbers of digits between the original volume resistivity and the after-change volume resistivity (in a precise sense, common logarithm values) mostly falls within two digits, preferably one digit or less. Here, X represents an arbitrary number of 2 to 11.

BEST MODE FOR CARRYING OUT THE INVENTION

Hereinafter, the present invention is described in detail.

The conductive fillers used in the present invention include at least two kinds of conductive fillers whose threshold values of percolation is different from each other by a specific range of difference. In the following, explanation on addition of the two kinds of conductive fillers is made by way of examples, and each of the fillers is referred to as "conductive filler (A)" and "conductive filler (s)". In a case where three or more kinds of conductive fillers are added, two of them need to meet the following requirements, and as long as the effects of the invention is not affected, types or properties of the other fillers may be determined according to uses of the invention.

First, conductive filler (A) which enables expression of conductivity when added even in a small amount is described. Examples of conductive filler (A) used in the present invention include (1) fine graphitic fiber and (2) carbon nanotube. As (1) fine graphitic fiber, those having a fiber diameter of 50 to 500 nm and an aspect ratio of 100 to 1000 are preferred. Further explanation will be made later. As (2) carbon nanotube, those having a fiber diameter of 1 to 50 nm and an aspect ratio of 100 to 1000 are preferred.

Particularly preferred among the above conductive fillers is (1) fine graphitic fiber. On the other hand, since (2) carbon nanotube, which is nanometer-order particles, has a large cohesive energy and therefore, it tends to form secondary particles and further form higher-order particles from agglomeration of secondary particles. Since it is very difficult to disperse these agglomerated particles in form of primary particles by use of shearing force at the time of kneading, the agglomerated particles are present in the resin in their agglomerated forms, whereby realize conductivity through linkage between particles.

Accordingly, controlling conductivity to be within a specific range depends on controlling dispersion of agglomerated particles at the time of kneading, in other words, on how precisely the size of agglomerated particles can be controlled. In contrast, (1) fine graphitic fiber, which forms agglomerated particles through electrostatic-like weak force, is advantageous in that the agglomerated particles can be easily raveled out by use of shearing force at the time of kneading so that each of the primary particles can be reproduced well and dispersed uniformly in the resin. Accordingly, in light of the purpose of controlling resistance in a semiconductive region, the fiber can be said to be a good conductive filler. Hereinbelow, the mode of the fine graphitic fiber is described.

It is preferable that the fiber diameter of the fine graphitic fiber be within a range of 50 to 500 nm. If the fiber diameter is less than 50 nm, the surface energy increases exponentially, which leads to rapid increase in cohesive force between filaments.

In a case where such a fine graphitic fiber is blended in and kneaded with resin, it is not sufficiently dispersed, resulting in agglomerated particles scattering in the resin, failing to efficiently form a conductive network and obtain reproducibility of conductivity. Further, agglomerated particles remaining to such defective dispersion cannot obtain a cross-linking effect with conductive filler (B) described later, deteriorating uniform stable resistivity.

If the fiber diameter exceeds 500 nm, a larger amount of the fine graphitic fiber will be required in order to achieve a desired conductivity, markedly deteriorating stability of conductivity. The reason lies in growth mechanism of fine carbonaceous fibers (product generated immediately after reaction, before graphitization treatment) in chemical vapor-grown method. Generally, through process that thermally-decomposed carbon is dissolved in catalyst fine particles of several nanometers order and deposited, fibers grow in the longitudinal direction as the first stage (growth of hollow tubes). It is said that this growth in the longitudinal direction ends in the very early stage of the reaction. Subsequently, in the process that thermally decomposed carbon is deposited and accumulated on the outer wall of the hollow tubes, fibers grow in the radial direction. That is, in this chemical vapor-grown method, the fiber length is mostly determined at the early stage of the reaction and the fiber diameter is determined by the reaction time. Therefore, naturally, the larger the fiber diameter, the smaller the aspect ratio of the fine carbonaceous fiber. In a case of fine graphitic fiber having a small aspect ratio, a large amount of conductive filler must be added in order to impart conductivity to the resin, which leads to increase in the threshold value of percolation. As a result, the difference in the threshold values of percolation from conductive filler (B) tends to become small, which leads to failure in obtaining stable region of conductivity.

It is preferable that the aspect ratio of the fine graphitic fiber be within a range of 100 to 1000, more preferably 120 to 500, still more preferably 150 to 300.

As a result of studied made on cases of adding fine graphitic fibers having different aspect ratios to resin, it has been found out that it is more advantageous to use fine graphitic fiber having a larger aspect ratio so that the amount of the fiber required for imparting conductivity to resin can be reduced and the threshold value of percolation can be small.

If the aspect ratio is less than 100, the amount of the fine graphitic fiber added to resin must be 10 mass %, narrowing the difference in threshold values of percolation from conductive filler (B), which causes failure in stabilization of conductivity. On the other hand, in cases where the aspect ratio exceeded 1000, the phenomenon that an increase in the aspect ratio caused a decrease in the threshold value did not occur. After resin and fine graphitic fiber were kneaded, a molded sample thereof was sliced to thereby prepare a thin film.

When the film was microscopically observed, many agglomerated particles remaining in the resin was found. The reason for this can be assumed that the increase in the aspect ratio strengthened three-dimensional entanglement among particles, so that searing force at the time of kneading the resin could not ravel out every filament. Therefore, if the aspect ratio of the fine graphitic fiber exceeds 1000, it is difficult to form efficient conductive network because of formation of agglomerated particles, which may lead to failure to obtain the effect of reduction in the threshold value of percolation.

It is preferable that the average interplanar spacing $d_{002}$ of the fine graphitic fiber used in the invention, as determined by X-ray diffraction method, be within a range of 0.336 to 0.343 nm, more preferably 0.337 to 0.341 nm, still more preferably 0.338 to 0.340 nm.

The fine carbonaceous fiber obtained by the reaction will grow in the radial direction like tree rings, as mentioned above, through parallel accumulation of thermally decomposed carbon on hollow tubes. Here, what corresponds to distance between tree rings is referred to as interplanar spacing $d_{002}$. The carbon graphene accumulated on the hollow tubes is arranged in a very disorderly manner immediately after the reaction and when microscopically observed, the fiber surface is rough. By heating this, the arrangement of the graphene can be orderly and the fiber surface can be smooth. As a result, electron mobility in the fiber can be enhanced and contact resistance can be reduced. By addition of a small amount of the fine graphitic fiber to resin, conductivity can be imparted to the resin. On the other hand, in a case where the average interplanar spacing $d_{002}$ exceeds 0.3453 nm, since the crystals have not grown sufficiently, as compared with crystallized graphitic fiber, resistivity of a single fiber is 10 times larger. Accordingly, when mixed with resin, electron transfer between fine carbonaceous fiber/resin/fine carbonaceous fiber becomes difficult. As a result, twice or more of the amount of the filler, as compared with the amount of fine graphitic fiber with well-developed crystals, is required to attain conductivity of the same level in the resin composite. Therefore, the difference in threshold values of percolation from conductive filler (B) becomes small and stability of conductivity tends to deteriorate.

It is preferred in the present invention that fine graphitic fiber capable of attaining volume resistivity of $10^6$ Ωcm or less when added alone to thermoplastic resin in an amount of 2 to 10 mass % be used, more preferably in an amount of 2.5 to 9 mass %, even more preferably 3 to 8 mass %. If an amount exceeding 10 mass % of fine graphitic fiber must be added to attain volume resistivity of the resin of $10^6$ Ωcm or less, the difference in threshold values of percolation from conductive filler (B) becomes small and stability of conductivity tends to deteriorate.

On the other hand, if an amount less than 2 mass % of fine graphitic fiber is to be added and the volume resistivity of the resin becomes $10^6$ Ωcm or less, resistivity values of the resin tend to vary because of a slight error in weighing out conductive filler (A).

It is preferred in the present invention that the amount of fine graphitic fiber to be added in combination with conductive filler (B) to thermoplastic resin be within a range of 1 to 10 mass %, more preferably 2 to 9 mass, still more preferably 2.5 to 8 mass %.

If the addition amount of fine graphitic fiber is less than 1 mass, when the content of conductive fillers ((A)+(B)) fluctuates by 10 mass %, fluctuation range in the volume resistivity of the resin tends to be larger than $10^{\pm 1}$ Ωcm.

On the other hand, if the addition amount of fine graphitic fiber exceeds 10 mass, the volume resistivity of the resin becomes smaller than $10^6$ Ωcm and tends to fall outside the semiconductive region.

The fine graphitic fiber having the above described characteristics, used in the present invention, can be prepared by thermally decomposing carbon source (organic compound) in the presence of organic transition metal compound.

Examples of carbon source (organic compound) serving materials for the fine graphitic fiber which can be used in the present invention include toluene, benzene, naphthalene, ethylene, acetylene, ethane, natural gases, carbon monoxide and mixtures thereof. Among them, aromatic hydrocarbons such as toluene and benzene are preferred.

The organic transition metal compound contains transition metal serving as catalyst. The transition metal is an element of groups 4 to 10 of the periodic table. Preferred examples thereof include ferrocene and nickelocene.

In an atmosphere of thermal decomposition reaction, sulfur compound such as sulfur and thiophene may be used as a catalyst aid for the purpose of efficiently removing gases such as hydrogen adsorbed on the surface of transition metal catalyst particles to thereby enhance catalyst activity.

Using reducing gas such as hydrogen as carrier gas, the organic compound, the organic transition metal compound and the sulfur compound are supplied into a reaction furnace heated to a temperature range of 800 to 1300° C. to thermally decompose to thereby obtain fine carbonaceous fiber.

As for form of the raw material, a material obtained by dissolving organic transition metal compound and sulfur compound in aromatic hydrocarbon and a material gasified at a temperature of 500° C. or lower can be used. However, in case of using liquid material, since gasification or decomposition of the material occurs on the wall of the reaction tube to thereby cause uneven distribution of the material, which results in a tendency for of thus generated vapor grown carbon fiber to agglomerate. Therefore, with respect to form of the raw material, gas material, which can enable uniform concentration of the raw material in the reaction tube, is preferred.

A preferred ratio of the transition metal catalyst to sulfur compound catalyst aid (sulfur/(transition metal+sulfur)) is in a range of 10 to 35 mass %. If the ratio is less than 10 mass %, removal of hydrogen adsorbed on the catalyst becomes incomplete, to thereby cause disturbance in supply of carbon source to the catalyst and as a result, generation of carbon particles other than fibers tends to occur.

If the ratio exceeds 35 mass %, catalyst activity is enhanced, which tends to result in increase in interaction between fiber filaments to cause increase in the number of branches in fiber, generation of radial fibers or the like to thereby form strongly agglomerated particles.

The preferred ratio of the supplied amount of the raw material to the carrier gas flow (raw material (g)/gas (L)) in the reaction tube is 1 g/L or less, more preferably 0.5 g/L or less, still more preferably 0.2 g/L or less. In a case where the concentration of the raw material in the vapor phase exceeds 1 g/L, heterogeneous nucleation of catalyst particles occurs on the surface of generated vapor grown carbon fiber and fine carbonaceous fiber filaments further generates fine carbonaceous fiber filaments from their surfaces, to thereby form a silver-frost-like fine carbonaceous fiber filaments and such a fiber alone cannot be singly dispersed.

It is preferred that thermal treatment at a temperature of 900 to 1300° C. in the inert atmosphere be carried out for the purpose of removing organic substances such as tars attached to fine carbonaceous fiber surface. Also, in order to enhance conductivity of vapor grown carbon fiber, it is preferred that further treatment at a temperature of 2000 to 3500° C. in the inert atmosphere be carried out to thereby develop crystals.

Any heat treatment furnace used for development of crystals may be used as long as the furnace can retain at a temperature of 2000° C. or higher, preferably 2300° C. or higher, for example, Acheson furnace, resistance furnace and high-frequency furnace can be employed. In some cases, a method where electricity is applied directly to powder or a molded body to heat it may be employed.

A preferred atmosphere for thermal treatment is non-oxygenated atmosphere, more preferably, a noble gas atmosphere of one or more kinds selected from argon, helium, neon and the like. The shorter the thermal treatment time, the more preferable in terms of productivity. If heating is continued for a long time, the formed body is sintered and solidified, to thereby deteriorate the production yield. Generally, retention of the temperature for 10 minutes to 1 hour after the temperature of the core part of the formed body or the like has reached the target temperature is sufficient.

In order for crystal of fine graphitic fiber to develop further to thereby enhance conductivity, boron carbide ($B_4C$), boron oxide ($B_2O_3$), elemental boron, boric acid ($H_3BO_3$) may be blended in conducting graphitization treatment by heating at a temperature of 2000 to 3500° C. in inert atmosphere.

The addition amount of boron compound, depending on chemical and physical properties, cannot be flatly defined. For example, in case of using boron carbide ($B_4C$), the amount is in a range of 0.05 to 10 mass %, preferably 0.1 to 5 mass %, based on the amount of carbon fiber.

By thermally treating with boron compound, crystallinity of graphite present in the fine graphitic fiber is enhanced and so is conductivity. A preferred boron amount contained inside fine graphitic fiber crystals or on the crystal surface is in a range of 0.01 to 5 mass %. For improvement in conductivity of the graphitic fiber or affinity with resin, more preferred amount is 0.1 mass % or more. The amount of boron which can be substituted into grapheme sheet is about 3 mass %. A larger amount, especially a boron amount exceeding 5 mass %, present in form of boron carbide or boron oxide and it may become a cause for decrease in conductivity.

Also, for the purpose of enhancing affinity between fine graphitic fiber and resin, the fine graphitic fiber may be subjected to oxidation treatment to introduce phenolic hydroxyl group, carboxyl group, quinone group or lactone group to the surface. Further, surface treatment may be conducted by using silane-based, titanate-based, aluminum-based or phosphate-based coupling agent.

Next, conductive filler (B) used in the invention will be described.

As conductive filler (B) used in the invention, milled fibers of polyacrylonitrile-based, pitch-based or rayon-based carbon fiber can be used. A preferred fiber diameter is in a range of 3 to 12 μm, more preferably 4 to 10 μm, still more preferably 5 to 8 μm. If the fiber diameter exceeds 12 μm, irregularities are formed by carbon fiber on surface of the formed body, resulting in difficulty in obtaining smooth surface.

A preferred aspect ratio of carbon fiber is in a range of 10 to 40, more preferably 15 to 35, still more preferably 20 to 30. If the aspect ratio of the carbon fiber exceeds 40, the threshold value of percolation becomes far below 30 mass %, which results in that the difference in threshold values of percolation from conductive filler (A) becomes smaller than 20 mass % and stability of conductivity tends to be markedly deteriorated.

A preferred interplanar spacing $d_{002}$ is in a range of 0.338 to 0.350 nm, more preferably 0.340 to 0.348 nm, still more preferably 0.342 to 0.346 nm.

Also, as conductive filler (B) used in the present invention, carbon particles, as well as the above-mentioned milled fibers, can be used. A preferred particle size is in a range of 1 to 50 μm, more preferably 5 to 40 nm, still more preferably 10 to 30 μm. If the particle size is finer than 1 μm, the threshold value of percolation becomes below 30 mass %, which results in that the difference in threshold values of percolation from conductive filler (A) becomes smaller than 20 mass %, whereby stability of conductivity tends to be markedly deteriorated and flowability of the resin tends to be impaired. In contrast, if the particle size exceeds 50 μm, it tends to be difficult for fine carbon fiber to serve as linkage between carbon particles, to thereby fail to obtain stability of conductivity.

A preferred interplanar spacing $d_{002}$ is in a range of 0.336 to 0.350 nm, more preferably 0.338 to 0.348 nm, still more preferably 0.340 to 0.346 nm.

The conductive filler (B) used in the present invention has a threshold value of percolation which value, when the filler (B) alone is added to resin, is different from the threshold value of percolation of the conductive filler (A) by a range of 10 to 50 mass %, preferably 22.5 to 45 mass %, more preferably 25 to 40 mass %.

Specifically, it is preferred that the amount of the conductive filler (B) when added alone to thermoplastic resin to obtain the volume resistivity of $10^6$ Ωcm or less, 22 to 60 mass %, be more preferably 25 to 55 mass %, still more preferably 28 to 50 mass %.

If the amount of the fine graphitic fiber required to obtain the volume resistivity of the resin of $10^6$ Ωcm or less exceeds 60 mass %, flowability of the resin tends to be deteriorated although conductivity tends to be stabilized.

In contrast, if the volume resistivity of the resin can be $10^6$ Ωcm or less by addition of the conductive filler (B) in an amount less than 22 mass %, the difference in threshold values of percolation between the conductive fillers (A) and (B) becomes small and thereby stability of conductivity tends to be reduced.

It is preferred that when the conductive filler (B) is added in combination with the conductive filler (A) to thermoplastic resin, the amount of the conductive filler (B) be in a range of 5 to 20 mass %, more preferably 6 to 15 mass %, still more preferably 7 to 12 mass %.

If the amount of the conductive filler (B) is less than 5 mass %, effect to supplement conductive paths of the conductive filler (A) will be lessened, which results in deterioration of stability of conductivity against changes in conditions at the time of kneading or molding process.

If the amount of the conductive filler (B) exceeds 20 mass %, flowability of the resin at the time of molding and flexibility of the molded product tends to be markedly deteriorated.

Moreover, it is preferred that the total amount of the conductive fillers ((A)+(B)) in the thermoplastic resin be 20 mass % or less, more preferably 18 mass % or less, still more preferably 16 mass % or less.

If the total amount of the conductive fillers ((A)+(B)) in the thermoplastic resin exceeds 20 mass %, flowability of the resin at the time of molding and/or flexibility of the molded product tends to be deteriorated.

The thermoplastic resin used in the present invention is selected from the group consisting of polyethylene, polypropylene, polystyrene, cycloolefin polymer, nylon 11, nylon 12, nylon 6, nylon 610, nylon 612, nylon 66, aromatic polyamide, AS resin(acrylonitrile/styrene copolymer), ABS resin(acrylonitrile/styrene/butadiene copolymer), polyethylene terephthalate, polybutylene terephthalate, polyethylene naphthalate, liquid crystal polyester, polyphenylene sulfide, polycarbonate, polysulfone, polyether sulfone, polyimide, polyether imide, polyamide imide, polyether ketone, polyether ether ketone, polyacetal, polyphenylene ether, modified polyphenylene ether, polybenzimidazole and fluorine resin.

Preferred from the viewpoint of heat resistance and chemical resistance are polyether ether ketone, polyether sulfone, polyether imide and liquid crystal polymer, preferred from the viewpoint of dynamic strength are polycarbonate, polyphenylene ether and polybutylene terephthalate, and preferred from the viewpoint of water-absorbing property and low out-gas generation is cycloolefin polymer.

In kneading the above conductive filler (A), conductive filler (B) and the resin, especially in a case where fine graphitic fiber is used as conductive filler (A), it is preferred that breaking of the fine graphitic fiber be controlled to the minimum. Specifically, it is preferred that the breaking ratio of the fine graphitic fiber be controlled to 20% or less, more preferably 15% or less, still more preferably 10% or less.

In order to carrying out the kneading step while controlling the breaking of the fine graphitic fiber to the minimum, for example, the following approaches may be employed.

Generally, in a case where inorganic filler is melt-kneaded with thermoplastic resin, high sharing force is applied to agglomerated inorganic filler to break the agglomeration of the filer into fine particles and then the filler is dispersed uniformly into the molten resin. As kneaders generating high shearing force, many of those employing millstone mechanism, such as a twin-screw unidirectional extruder having introduced therein a kneading disc applying high shearing force onto screw elements, are used. However, when such a kneader is used, filaments of the fine graphitic fiber will be broken. In contrast, in a case where a single screw extruder is used, although breaking of filaments can be suppressed, dispersion of the fiber cannot be uniform. Therefore, in order to attain uniform dispersion while suppressing breaking of the fiber, it is preferred to lower shearing force by using a co-rotating twin-screw extruder without a kneading disc, to use a pressure kneader which can attain dispersion over a long period of time without high shearing force, or to use a special mixing element in a single-screw extruder.

Also, a preferred method for introducing the fine graphitic fiber into a kneader is a method of introducing it into molten resin. For example, in a case where the fine graphitic fiber and the thermoplastic resin are kneaded in a twin-screw unidirectional extruder, a preferred kneading method is that pellets of the resin are introduced in a hopper in the upstream of the kneader, the resin pellets are melted with heating from a heater and shearing heat from the screws, and then the fine graphitic fiber is side-fed from the midstream of the kneader into the molten resin. If the fine graphitic fiber and the resin pellets are introduced from the hopper into the kneader at the same time, breaking of filaments of the fine graphitic fiber by the pellets tends to proceed until melting of the pellets completes.

Since the fine graphitic fiber used in the present invention, having a bulk specific gravity of 0.01 to 0.1 $g/cm^3$, readily involves air, it is difficult to deaerate by using a normal single-screw extruder or unidirectional two-screw extruder and the fiber cannot easily introduced into the resin. In this case, a batch-type pressure kneader having excellent chargeability and capable of suppressing breaking of fiber, can be used. The resin kneaded by a batch-type pressure kneader may be introduced before solidified into a single-screw extruder to form it into pellets.

Examples of injection-molding method include, other than generally used methods, various methods such as insert injection molding where the material is integrally molded with metal components or other components, double-color injection molding, core-back injection molding, sandwich injection molding and injection press molding. In injection molding, it is required to set appropriate conditions in consideration fro changes in surface resistance value caused by the resin temperature, the molding die temperature and the molding pressure.

Examples of specific uses of the semiconductive resin according to the present invention include, in electric and electronic fields, wafer carrier, wafer cassette, tote bottle, wafer boat, IC tip tray, IC tip carrier, IC carrier tube, IC card, tape packing and a reel packing, liquid crystal cassette, various cases, storage tray, storage bottle, carrier device component, a magnetic card reader, connector, computer slot, HD carrier, MR head carrier, GMR head carrier, HSA carrier, voice coil motor (VCM) of HDD and liquid crystal panel carrier; in the field of office automation equipment, electrically-charged members in image-forming apparatuses such as an electrophotographic copier and an electrostatic recording apparatus, such as a charged roller, a charged belt, a discharging belt, a transfer roller, a transfer belt, a developing roller, transfer drum for recording apparatus, a printed-circuit board cassette, bushing, paper and bill carrier, paper feeder rail, font cartridge, ink ribbon canister, guide pin, tray, roller, gear, sprocket, housing for computer, modem housing, monitor housing, CD-ROM housing, printer housing, connector and computer slot; in the field of communication instrument, components of cellular phone, pager and various slide members; in the automotive field, various members such as interior material, underhood, electronic or electric device housing, gas tank cap, fuel filter, fuel line connector, fuel line clip, fuel tank, and door handle; in other fields, covering material for electric wires and power cables, electric cable support, a radio wave absorber, floor material, carpet, mothproof sheet, palette, shoe sole, tape, brush, blower fan, sheet-shaped heating element and polyswitch.

However, they are merely exemplary and all products providing advantageous effect of the invention are included in the scope of the invention.

EXAMPLES

Hereinafter, the present invention is described in greater detail by referring to Examples. However, the scope of the present invention is not limited by the following Examples. Firstly, production method of raw materials and samples are to be explained.

The production method of conductive filler (A) used in Examples and Comparative Examples is described below.
(Production Method of Fine Graphitic Fiber: VGCF-S)

Benzene, ferrocene and thiophene of a mass ratio of 92:7:1 are mixed together to prepare a raw material liquid. The raw material liquid is supplied into an evaporator heated at 400° C. to volatilize it. The volatilized raw material gas is supplied by using a carrier hydrogen gas into a SiC-made reaction furnace (having an inner diameter of 120 mm and a height of 2000 mm) heated at 1250° C. The supply rate of the raw material is 10 g/min and the flow rate of hydrogen is 60 L/min.

A graphite crucible (inner diameter: 100 mm, height; 150 mm) is filled with 80 g of the above-obtained reaction product and calcinated at 1000° C. for 1 hour in argon atmosphere. A graphite crucible (inner diameter: 100 mm, height: 150 mm) is filled with 80 g of the fine carbonaceous fiber obtained after the above calcination at 1000° C. and graphitization treatment at 3000° C. is carried out using a high-frequency heating furnace for 30 minutes in argon atmosphere.

[Conductive Filler (A) Used in Examples and Comparative Examples]
(1) Carbon nanofiber (trade name: vapor grown carbon fiber (hereinafter referred to as VGCF-S) manufactured by SHOWA DENKO K.K.)
(2) Carbon black (trade name: KETJENBLACK EC-600JD (hereinafter referred to as KB)) manufactured by Lion Agzo Co., Ltd.
(3) Carbon nanotube (hereinafter referred to as CNT)

[Conductive Filler (B) Used in Examples and Comparative Examples]
(4) Carbon nanofiber (trade name: vapor grown carbon fiber (hereinafter referred to as VGCF) manufactured by SHOWA DENKO K.K.)
(5) Carbon fiber (trade name: HTA-CMF-0160-OH (hereinafter referred to as CF 1) manufactured by TOHO TENAX Co., Ltd.)
(6) Carbon fiber (trade name: HTA-CMF-0040-OH (hereinafter referred to as CF 2) manufactured by TOHO TENAX Co., Ltd.)
(7) Graphite particles (trade name: UF-G30 manufactured by SHOWA DENKO K.K.)
(8) Graphite particles (trade name: UF-G5 manufactured by SHOWA DENKO K.K.)
(9) Carbon precursor prepared by pulverizing petroleum coke or pitch coke and controlling the particle size to be 20 μm.

In Examples and Comparative Examples, a polyether ether ketone (hereinafter, sometimes abbreviated as PEEK, tradename: 150 PF, manufactured by Victrex plc.) and a polycarbonate (hereinafter sometimes abbreviated as PC, trade name: Iupilon S3000, manufactured by Mitsubishi Engineering-Plastics Corporation) are used as a thermoplastic resin.

[Kneading Method]

Examples 1 to 14 and 17 and Comparative Examples 1 to 11

For kneading, a corotating twin screw extruder (ZE40A× 40D, screw diameter: 43 mm, L/D=37) manufactured by Berstroff was used. Resin and conductive filler (B) are introduced from a hopper and conductive filler (A) is introduced from a side feeder.

The kneading is conducted under the conditions that the resin temperature of polyether ether ketone (PEEK) is 380° C. and a screw rotation speed is 100 rpm. As for polycarbonate (PC), the resin temperature is 270° C. and a screw rotation speed is 100 rpm.

[Evaluating Method of Percolation Threshold Value]

For kneading, Labo Plastomill (trade name, manufactured by Toyo Seiki Seisaku-sho, LTD.) is used. First, resin is introduced into the mill, and when the resin is melted, conductive filler (A) or (B) is introduced therein.

The kneading is conducted under the conditions that the resin temperature is 280° C., the mixer rotation frequency is 80 rpm and the kneading time is 10 minutes. The kneaded sample is molded by melt-pressing into a flat plate having a size of 100×100×2 mm and its volume resistivity values thereof are measured and the carbon filler content at which the volume resistivity value changes drastically from insulative region to current-conducting region, is regarded as the percolation threshold value.

Examples 15 to 16 and Comparative Example 13

For kneading, a co-rotating twin screw extruder (ZE40A× 40D, screw diameter: 43 mm, L/D=37) manufactured by Berstroff is used. Resin is introduced from a hopper and conductive filler (A) is introduced from a side feeder or a hopper.

The kneading is conducted under the conditions of a resin temperature of 270° C. and a screw rotation speed of 100 rpm.

[Method of Molding]

Examples 1 to 17 and Comparative Examples 1 to 11 and 13

Injection molding is conducted to mold a flat plate (100× 100×2 (thickness) mm) using a injection molding machine (trade name: "F-45", manufactured by Klockner) under the conditions of molding temperature of 400° C., die temperature of 180° C. and injection speed of 50 mm/sec in the case of polyether ether ketone (PEEK), and in the case of polycarbonate (PC), molding temperature is 280° C., die temperature is 100° C. and injection speed of 50 mm/sec.

Compression molding is conducted at 280° C. with a pressure of 200 kgf/cm$^2$ using a thermoforming machine manufactured by Nippo engineering Co., LTD.

Sheet molding is conducted at 280° C. for PC and 370° C. for PEEK, using a T-die (with 250 mm in width and 200 μm in thickness) and an uniaxial extruder having a diameter of with 30 mmΦ (manufactured by SOKEN). The results are shown in Table 2. In Table 2, o is the case where change in volume resistivity of the resin satisfies $10^{X\pm1}$ Ωcm ($2 \leq X \leq 11$), x is the case where change in volume resistivity of the resin does not satisfy $10^{X\pm1}$ Ωcm ($2 \leq X \leq 11$).

[Fiber Diameter and Particle Size]

A measuring method of shape parameter of conductive filler is described below. Conductive fillers are observed by a scanning electron microscope at magnification of ×100 to 30,000. The micrographic images are input into an image analyzer (trade name: "LUZEX-AP", manufactured by NIRECO Corporation) and fiber diameter or minor axis of 300 conductive filler filaments are measured to obtain a number average fiber diameter or particle size.

KETJENBLACK is observed by a scanning electron microscope at magnification of ×500,000 and subjected to the same analysis as described above.

[Fiber Length and Aspect Ratio]

Conductive fillers are observed continuously by an aspect ratio scanning electron microscope at magnification of ×100 to 3,000 panoramically. The obtained images are input into the image analyzer and fiber length or major axes of 300 conductive filler filaments are measured to obtain a number average fiber length.

Aspect ratio is calculated by dividing an average fiber length by an average fiber diameter.

[Specific Surface Area]

A specific surface area is measured by nitrogen gas absorption method using NOVA 1000 (trade name, manufactured by Yuasa Ionics Inc.).

[Bulk Density]

1 g of conductive filler is put into a 100 ml of measuring cylinder. A bulk density is obtained by measuring content after shaking the cylinder for 1 minute with a shaker.

[Resistivity]

A resistivity is obtained by using a silver paste which has lower resistivity than that of carbon filler, adding the carbon filler to the silver paste, increasing the content of the carbon filler in the silver paste and extrapolating the value based on 100% of carbon filler.

Measurement of volume resistivity of a molded body is conducted with an insulation resistance meter (high resistance meter, trade name: R8340, manufactured by ADVANTEST CORPORATION), on molded bodies having a volume resistivity of $10^8$ Ωcm or more. On molded bodies having a volume resistivity of $10^8$ Ωcm or less, a four-probe method (trade name: Loresta HP MCP-T410, manufactured by Mitsubishi chemical corporation) is used.

[Recovery of Filler after Kneading]

In the case of PEEK resin composition, 1 g of the composition is immersed in hot concentrated sulfuric acid for 10 hours. This is subjected to filtration, water washing and drying to recover the filler contained in the resin.

In the case of PC resin composition, 1 g of the composition is immersed in chloroform for 10 hours. This is subjected to filtration, water washing and drying to recover the filler contained in the resin.

In the case of COP (cyclo olefin polymer) resin composition, 1 g of the composition is placed in a graphite crucible and calcinated at 1000° C. in the presence of argon to decompose the resin, and whereby the filler alone is recovered.

[Breaking Ratio of Carbon Fiber]

The recovered fiber is observed by an electron microscope to obtain a number average fiber length by an image analysis. The Breaking ratio of the carbon fiber is calculated by the following formula.

Breaking ratio of carbon fiber (%)={1−(carbon fiber length of molded composition/fiber length of raw material vapor grown carbon fiber)}×100

[Particle Elimination (Berry Drop)]

A flat plate of 100×100×2 mm is immersed in 500 ml of pure water and applied thereto is 40 KHz of ultrasonic wave for 60 seconds. After that, the extracted water is aspirated by a submerged particle counter to thereby count the number of particles having a particle size of 1 μm or more. The cases where the number of such particles exceeds 5000 per unit surface area of 1 $cm^2$ are evaluated as "x", those with the number 5000 or less are evaluated as "o".

[Outgas Measurement]

The amounts of n-heptane, methylene chloride and total outgas are measured respectively by using headspace gas chromatography according to the method described in Japanese Patent Application Laid-open No. 118222/2001. Specific measurement method is described below.

Two pieces of test sample (total area: 12.6 $cm^2$) of 22×10×3 mm are cut out from a molded body. A gas is extracted from the sample under the conditions of a heating temperature of 85° C., an equilibration time of 16 hours in a 22 ml-volume vial into which 10 μL of n-octane is added as an internal standard substance. The gas generated in the vial is measured by gas chromatogram (GC/MS). The measurement condition is shown below. Apparatus: "GC/MS QP5050" manufactured by Shimadzu Corporation, Column: CHROMPAK PORAPLOT Q 0.32 mm×25 m,
Column temperature: 35 to 240° C. (10° C./min),
Inlet temperature: 230° C.,
Interface temperature: 280° C.,
Carrier gas: helium,
Inlet pressure: 100 KPas,
Total flow rate: 60 mL/min,
Injection volume: 2 mL.

The total amount of outgas, the generated amount of methylene chloride and n-heptane, are calculated from the following method.

Total outgas amount (μg/g)=(total peak area of sample−total peak area of blank)/(n-octane peak area/n-octane mass (g))×1/(sample mass(g))

Generated methylene chloride amount (μg/g)=(peak area of methylene chloride)/(peak area of n-octane/n-octane mass (g))×1/(sample mass(g))

Generated heptane amount (μg/g)=(peak area of heptane)/(peak area of n-octane/n-octane mass (g))×1/(sample mass(g))

The cases which satisfied all requirements that the total outgas amount is 1 μg/g or less, that the generated methylene chloride amount is 0.1 μg/g or less and that the generated carbon hydride amount is 0.5 μg/g or less, are evaluated as "o", those which fell outside one or more of these requirements are evaluated as "x".

The features of the conductive fillers are collectively shown in Table 1 and the compositions and properties of each composition are collectively shown in Table 2 and 3.

TABLE 1

| Electro-conductive filler | Average fiber diameter or particle size | Average fiber length | Aspect ratio | Specific surface area ($m^2/g$) | Purity (%) | Specific resistance (Ωcm) | Percolation threshold value(%) |
|---|---|---|---|---|---|---|---|
| VGCF | 150 nm | 9 μm | 60 | 13 | 99.9 | $10^{-4}$ | 13 |
| VGCF-S | 100 nm | 10 μm | 100 | 23 | 99.9 | $10^{-4}$ | 3 |
| CNT | 10 nm | 1 μm< | 100< | 250 | 98< | $10^{-4}$ | 3 |
| KB(EC600JD) | 30 nm | — | 1 | 1400 | 98< | $10^{-1}$ | 7 |
| CF 1 | 7 μm | 1.1 mm | 160 | 0.2 | 98< | $10^{-3}$ | 18 |
| CF 2 | 7 μm | 280 μm | 40 | 10 | 98< | $10^{-3}$ | 50 |
| UF-G 30 | 10 μm | — | 1 | 10 | 99.4< | $10^{-3}$ | 40 |
| UF-G 5 | 3 μm | — | 1 | 25 | 98< | $10^{-3}$ | 25 |
| Carbon precursor | 20 μm | — | 1 | 1.1 | <98 | $<10^2$ | 55 |

TABLE 2

| | Conductive filler(A) | | | Conductive filler(B) % | Fillers other than (A) & (B) | Difference in percolation threshold value (B) − (A) % |
|---|---|---|---|---|---|---|
| | Thermoplastic resin | Type | Content (mass %) | | | |
| Ex. 1 | PC | VGCF-S | 1.5 | UF-G5 8.5 13.5 18.5 | — | 23 |
| Ex. 2 | PC | VGCF-S | 2.5 | UF-G5 7.5 12.5 17.5 | — | 23 |
| Ex. 3 | PC | VGCF-S | 3 | UF-G5 7 12 17 | — | 23 |
| Ex. 4 | PC | VGCF-S | 5 | UF-G5 5 10 15 | — | 23 |
| Ex. 5 | PC | VGCF-S | 2.5 | UF-G5 5 7.5 10 | UF-G30 2.5 5 7.5 | 23 |
| Ex. 6 | PC | VGCF-S | 3 | UF-G30 7 12 17 | | 37 |
| Ex. 7 | PC | VGCF-S | 3 | CF1 7 12 17 | | 15 |
| Ex. 8 | PC | VGCF-S | 3 | CF2 7 12 17 | | 47 |
| Ex. 9 | PC | VGCF-S | 5 | VGCF 5 10 15 | | 10 |
| Ex. 10 | PC | CNT | 1.5 | UF-G5 8.5 13.5 18.5 | | 23 |
| Ex. 11 | PC | CNT | 3 | UF-G5 7 12 17 | | 23 |
| Ex. 12 | PEEK | VGCF-S | 2 | UF-G5 8 13 18 | | 23 |
| Ex. 13 | PEEK | VGCF-S | 5 | UF-G5 5 10 15 | | 23 |
| Ex. 14 | PEEK | CNT | 5 | UF-G5 5 10 15 | | 23 |
| Ex. 17 | PC | KB | 7 | UF-G5 5 10 15 | | 18 |
| Comp. Ex. 1 | PC | VGCF-S | 10 15 20 | | | — |
| Comp. Ex. 2 | PC | | | VGCF 10 15 20 | | — |
| Comp. Ex. 3 | PC | CNT | 10 15 20 | | | — |
| Comp. Ex. 4 | PC | KB | 10 15 20 | | | — |
| Comp. Ex. 5 | PC | | | CF1 10 15 20 | | — |
| Comp. Ex. 6 | PC | | | CF2 10 15 20 | | — |
| Comp. Ex. 7 | PC | | | UF-G5 10 15 20 | | — |
| Comp. Ex. 8 | PC | | | UF-G30 10 15 20 | | — |
| Comp. Ex. 9 | PC | | | Carbon precursor 10 15 20 | | — |
| Comp. Ex. 10 | PC | VGCF-S | 1.5 | Carbon Precursor 8.5 13.5 18.5 | | 53 |
| Comp. Ex. 11 | PC | VGCF-S | 3 | Carbon precursor 7 12 17 | | 53 |

| | Volume resistivity (Ωcm) Conductive filler(A) + (B) content (mass %) | | | Injection molded product | Sheet molded product | Compression molded product | Berry drop | Out-gas |
|---|---|---|---|---|---|---|---|---|
| | 10 | 15 | 20 | | | | | |
| Ex. 1 | $4 \times 10^{11}$ | $8 \times 10^{10}$ | $3 \times 10^{10}$ | ○ | ○ | ○ | ○ | ○ |
| Ex. 2 | $3 \times 10^{8}$ | $8 \times 10^{7}$ | $5 \times 10^{7}$ | ○ | ○ | ○ | ○ | ○ |
| Ex. 3 | $2 \times 10^{6}$ | $9 \times 10^{5}$ | $6 \times 10^{5}$ | ○ | ○ | ○ | ○ | ○ |
| Ex. 4 | $1 \times 10^{3}$ | $8 \times 10^{2}$ | $5 \times 10^{2}$ | ○ | ○ | ○ | ○ | ○ |
| Ex. 5 | $2 \times 10^{8}$ | $7 \times 10^{7}$ | $3 \times 10^{7}$ | ○ | ○ | ○ | ○ | ○ |
| Ex. 6 | $4 \times 10^{6}$ | $9 \times 10^{5}$ | $5 \times 10^{5}$ | ○ | ○ | ○ | ○ | ○ |
| Ex. 7 | $4 \times 10^{6}$ | $8 \times 10^{5}$ | $4 \times 10^{5}$ | ○ | ○ | ○ | ○ | ○ |
| Ex. 8 | $3 \times 10^{7}$ | $8 \times 10^{6}$ | $4 \times 10^{6}$ | ○ | ○ | ○ | ○ | ○ |
| Ex. 9 | $3 \times 10^{3}$ | $8 \times 10^{2}$ | $4 \times 10^{2}$ | ○ | ○ | ○ | ○ | ○ |
| Ex. 10 | $4 \times 10^{11}$ | $9 \times 10^{10}$ | $5 \times 10^{10}$ | ○ | ○ | ○ | ○ | ○ |

TABLE 2-continued

| | | | | | | | | |
|---|---|---|---|---|---|---|---|---|
| Ex. 11 | $4 \times 10^6$ | $8 \times 10^5$ | $5 \times 10^5$ | ○ | ○ | ○ | ○ | ○ |
| Ex. 12 | $4 \times 10^{11}$ | $8 \times 10^{10}$ | $5 \times 10^{10}$ | ○ | ○ | ○ | ○ | ○ |
| Ex. 13 | $5 \times 10^7$ | $8 \times 10^6$ | $3 \times 10^6$ | ○ | ○ | ○ | ○ | ○ |
| Ex. 14 | $6 \times 10^7$ | $9 \times 10^6$ | $5 \times 10^6$ | ○ | ○ | ○ | ○ | ○ |
| Ex. 17 | $8 \times 10^8$ | $2 \times 10^8$ | $8 \times 10^7$ | ○ | ○ | ○ | x | x |
| Comp. Ex. 1 | $4 \times 10^2$ | $4 \times 10^1$ | $6 \times 10^0$ | x | x | x | ○ | ○ |
| Comp. Ex. 2 | $1 \times 10^{12}$ | $7 \times 10^6$ | $1 \times 10^3$ | x | x | x | ○ | ○ |
| Comp. Ex. 3 | $8 \times 10^2$ | $7 \times 10^1$ | $2 \times 10^1$ | x | x | x | ○ | ○ |
| Comp. Ex. 4 | $2 \times 10^{10}$ | $3 \times 10^5$ | $5 \times 10^3$ | x | x | x | x | x |
| Comp. Ex. 5 | $3 \times 10^{15}$ | $2 \times 10^{15}$ | $6 \times 10^{14}$ | x | x | x | x | ○ |
| Comp. Ex. 6 | $5 \times 10^{15}$ | $3 \times 10^{15}$ | $1 \times 10^{15}$ | x | x | x | x | ○ |
| Comp. Ex. 7 | $5 \times 10^{15}$ | $3 \times 10^{15}$ | $2 \times 10^{15}$ | x | x | x | ○ | ○ |
| Comp. Ex. 8 | $6 \times 10^{15}$ | $5 \times 10^{15}$ | $2 \times 10^{15}$ | x | x | x | ○ | ○ |
| Comp. Ex. 9 | $8 \times 10^{15}$ | $7 \times 10^{15}$ | $7 \times 10^{15}$ | x | x | x | x | x |
| Comp. Ex. 10 | $5 \times 10^{14}$ | $5 \times 10^{14}$ | $2 \times 10^{14}$ | x | x | x | x | x |
| Comp. Ex. 11 | $8 \times 10^{13}$ | $5 \times 10^{13}$ | $5 \times 10^{13}$ | x | x | x | x | x |

TABLE 3

| | Thermo-plastic resin | Conducive filler(A) Kind | Conducive filler(A) Content (mass %) | Conductive filler(B) Kind | Conductive filler(B) Content (mass %) | Co-rotating twin-screw extruder extruding condition Filler(A) inlet position | Co-rotating twin-screw extruder extruding condition Filler(B) inlet position | Co-rotating twin-screw extruder extruding condition Breaking ratio (%) of filler(A) | Co-rotating twin-screw extruder extruding condition Volume resistivity (Ωcm) |
|---|---|---|---|---|---|---|---|---|---|
| Ex. 15 | PC | VGCF-S | 2.5 | CF 2 | 7.5 | side | side | 10 | $9 \times 10^{10}$ |
| Ex. 16 | PC | VGCF-S | 2.5 | CF 2 | 12.5 | side | hopper | 8 | $1 \times 10^9$ |
| Comp. Ex. 13 | PC | VGCF-S | 2.5 | CF 2 | 12.5 | hopper | hopper | 25 | $8 \times 10^{13}$ |

INDUSTRIAL APPLICABILITY

Since the change of volume resistivity can be controlled in a narrow range (within $10^{X\pm1}$ (Ωcm)) even when the content of the electroconductive filler in a resin is fluctuated in 10 mass %, the semiconductive resin composition according to the invention can be used in a wide range, for example, in electrical and electronic fields, as wafer carrier, wafer cassette, tote bottle, wafer boat, IC tip tray, IC tip carrier, IC carrier tube, IC card, tape packing and reel packing, liquid crystal cassette, various cases, storage tray, storage bottle, carrier device components, magnetic card reader, connector, computer slot, HD carrier, MR head carrier, GMR head carrier, HSA carrier, a voice coil motor (VCM) of HDD or liquid crystal panel carrier; in the field of office automation equipment, as electrically-charged members in image-forming apparatuses such as an electrophotographic copier and an electrostatic recording apparatus, such as charged roller, charged belt, neutralized belt transfer roller, transfer belt and developing roller; a transfer drum for recording apparatus, printed-circuit board cassette, bushing, paper and bill carrier, paper feeder rail, font cartridge, ink ribbon canister, guide pin, tray, roller, gear, sprocket, housing for computer, modem housing, monitor housing, CD-ROM housing, printer housing, connector and computer slot; in the field of communication instrument, parts of cellular phone, pager or various slide members; in the automotive field, as interior material, underhood, electronic or electric device housing, gas tank cap, fuel filter, fuel line connector, fuel line clip, fuel tank, or door handle and various parts; in other fields, as covering materials of electric wire and power cable, electric cable support, radio wave absorber, floor material, carpet, mothproof sheet, palette, shoe sole, tape, brush, blower fan, sheet-shape heating element or polyswitch.

The invention claimed is:

1. A semiconductive resin composition containing two or more kinds of conductive fillers, wherein the difference in threshold values of percolation between at least two kinds of the conductive fillers is within a range of 10 to 50 mass %, and the volume resistivity of the semiconductive resin composition is $10^6$ to $10^{12}$ Ωcm, wherein the conductive fillers comprise conductive filler (A) having a threshold value of percolation of 2 to 10 mass % and conductive filler (B) having a threshold value of percolation of 13 to 60 mass %, the threshold value of percolation being obtained in adding a single conductive filler to a resin, wherein conductive filler (A) consists of carbon fibers having a tubular structure obtained through parallel accumulation of thermally decomposed carbon on hollow tubes, wherein the semiconductive resin composition comprises from 1 to 10 mass % of conductive filler (A) and from to 19 mass % of conductive filler (B) in thermoplastic resin, wherein the semiconductive resin composition comprises a region where change in volume resistivity of the resin complex is $10^{X\pm1}$ Ωcm ($2 \leq X \leq 11$) in an extent that the total amount of the conductive fillers in the resin is within a range of 10 to 20 mass %.

2. The semiconductive resin composition according to claim 1, wherein the at least two kinds of the conductive fillers each contain 98 mass % or more of carbon and the volume resistivity of each of the fillers is $10^1$ Ωcm or less.

3. The semiconductive resin composition according to claim 1, wherein the difference between at least two kinds of the conductive fillers in threshold values of percolation obtained in adding a single conductive filler to a resin is within a range of 20 to 40 mass %.

4. The semiconductive resin composition according to claim 1, wherein the total content of conductive filler (A) and conductive filler (B) in the thermoplastic resin is 20 mass % or less.

5. The semiconductive resin composition according to claim 1, wherein conductive filler (A) is fine graphitic fiber having a fiber diameter of 3.5 to 120 nm.

6. The semiconductive resin composition according to claim 1, wherein conductive filler (B) is fine graphitic fiber having a fiber diameter of 120 to 500 nm, carbon fiber having a fiber diameter of 3 to 12 μm or carbon particles having a particle size of 1 to 500 μm.

7. The semiconductive resin composition according to claim 1, wherein the thermoplastic resin is at least one kind selected from the group consisting of polypropylene, polystyrene, ABS resin, polyacetal, polybutylene terephthalate, polycarbonate, polyamide, polyphenylene ether, polyphenylene sulfide, polyether ether ketone, polyether ketone, polysulfone, polyether sulfone, polyether imide, liquid crystal polymer, cycloolefin polymer, fluorine resin, polyimide and polybenzimidazole.

8. A product formed of the semiconductive resin composition described in claim 1.

9. The formed product according to claim 8, wherein the number of particles having a particle size of 1 μm or more dropping off the surface of the formed product is 5000 pcs/cm² per unit area or less when the formed product having a surface area of 100 to 1000 cm² is immersed in 500 ml of pure water and ultrasonic wave of 40 kHz is applied for 60 seconds.

10. The formed product according to claim 8, wherein the total outgas amount is 1 μg/g or less, the amount of methylene chloride is 0.1 μg/g or less, and the amount of hydrocarbon is 0.5 μg/g or less in measurement on those generated from 12.6 cm² of surface area by headspace gas chromatogram under conditions of heating temperature of 85° C. and equilibration time of 16 hours.

11. A part used in transportation comprising the formed body product according to claim 8.

12. A part used in transportation in clean room, comprising the formed product according to claim 8.

13. An injection-molded product formed of the semiconductive resin composition described in claim 1.

14. A compression-molded product formed of the semiconductive resin composition described in claim 1.

15. An extrusion-molded product formed of the semiconductive resin composition described in claim 1.

16. A sheet product formed of the semiconductive resin composition described in claim 1.

17. An article formed of the semiconductive resin composition described in claim 1, wherein the article is a spin chuck, an IC test socket, various rolls in copiers, a seamless belt, a roller bearing, an antistatic fiber, a part for electrostatic coating, a fuel tube, a peripheral part around fuel or a tube for chemicals.

18. A method of producing a semiconductive resin composition having a volume resistivity of $10^6$ to $10^{12}$ Ωcm and containing two or more kinds of conductive fillers, wherein at least two kinds of the conductive fillers having a difference in threshold values of percolation between the two within a range of 10 to 50 mass % are blended in a thermoplastic resin, wherein the conductive fillers comprise conductive filler (A) having a threshold value of percolation of 2 to 10 mass % and conductive filler (B) having a threshold value of percolation of 13 to 60 mass % the threshold value of percolation being obtained in adding a single conductive filler to a resin, wherein conductive filler (A) consists of carbon fibers having a tubular structure obtained through parallel accumulation of thermally decomposed carbon on hollow tubes, wherein the semiconductive resin composition comprises from 1 to 10 mass % of conductive filler (A) and from 5 to 19 mass % of conductive filler (B) in thermoplastic resin, wherein the semiconductive resin composition comprises a region where change in volume resistivity of the resin complex is $10^{X\pm1}$ Ωcm ($2 \leq X \leq 11$) in an extent that the total amount of the conductive fillers in the resin is within a range of 10 to 20 mass %.

19. The method of producing the semiconductive resin composition according to claim 18, wherein the at least two kinds of the conductive fillers each contain 98 mass % or more of carbon and the volume resistivity of each of the fillers is $10^1$ Ωcm or less.

20. The method of producing the semiconductive resin composition according to claim 18, wherein the difference between at least two kinds of the conductive fillers in threshold values of percolation is within a range of 20 to 40 mass %, the threshold value of percolation being obtained in adding a single conductive filler to a resin.

21. The method of producing the semiconductive resin composition according to claim 18, wherein the total content of conductive filler (A) and conductive filler (B) in thermoplastic resin is 20 mass % or less.

22. The method of producing the semiconductive resin composition according to claim 18, wherein conductive filler (A) is fine graphitic fiber having a fiber diameter of 3.5 to 120 nm.

23. The method of producing the semiconductive resin composition according to claim 18, wherein conductive filler (B) is fine graphitic fiber having a fiber diameter of 120 to 500 nm, carbon fiber having a fiber diameter of 3 to 12 μm or carbon particles having a particle size of 1 to 500 μm.

24. The method of producing the semiconductive resin composition according to claim 18, wherein the thermoplastic resin is at least one kind selected from the group consisting of polypropylene, polystyrene, ABS resin, polyacetal, polybutylene terephthalate, polycarbonate, polyamide, polyphenylene ether, polyphenylene sulfide, polyether ether ketone, polyether ketone, polysulfone, polyether sulfone, polyether imide, liquid crystal polymer, cycloolefin polymer, fluorine resin, polyimide and polybenzimidazole.

25. The method of producing the semiconductive resin composition according to claim 18, wherein conductive filler (A) is a fine graphitic fiber, the blending of conductive fillers (A) and (B is a melt-blending of conductive fillers (A) and (B) in the thermoplastic resin and when the fibers are blended with the thermoplastic resin rupture of the fine graphitic fiber is controlled to be 20% or less.

* * * * *